(12) United States Patent
Umezawa et al.

(10) Patent No.: US 9,594,276 B2
(45) Date of Patent: Mar. 14, 2017

(54) OPTICAL DIFFRACTION ELEMENT, OPTICAL PICKUP, AND OPTICAL DIFFRACTION ELEMENT MANUFACTURING METHOD

(71) Applicant: ARISAWA MFG. CO., LTD., Niigata (JP)

(72) Inventors: Yasuaki Umezawa, Niigata (JP); Kenichi Watabe, Niigata (JP)

(73) Assignee: ARISAWA MFG. CO., LTD., Niigata (JP)

(*) Notice: Subject to any disclaimer, the term of this patent is extended or adjusted under 35 U.S.C. 154(b) by 433 days.

(21) Appl. No.: 14/080,795

(22) Filed: Nov. 15, 2013

(65) Prior Publication Data
US 2014/0071394 A1 Mar. 13, 2014

Related U.S. Application Data

(63) Continuation of application No. PCT/JP2012/002053, filed on Mar. 23, 2012.

(30) Foreign Application Priority Data

May 20, 2011 (JP) .................. 2011-113966

(51) Int. Cl.
*G02F 1/1337* (2006.01)
*G02B 5/30* (2006.01)
(Continued)

(52) U.S. Cl.
CPC .......... *G02F 1/133753* (2013.01); *G02B 5/30* (2013.01); *G02F 1/13378* (2013.01); *G11B 7/1353* (2013.01); *G11B 7/1365* (2013.01)

(58) Field of Classification Search
CPC .......... G02F 1/13378; G02F 1/133788; G02F 2001/133757; G02F 2001/133761
See application file for complete search history.

(56) References Cited

U.S. PATENT DOCUMENTS

| 6,307,609 B1 * | 10/2001 | Gibbons ........... G02F 1/133788 349/123 |
| 8,867,133 B2 * | 10/2014 | Seo ...................... G02B 27/285 349/123 |
| 2011/0304782 A1 | 12/2011 | Akao et al. |

FOREIGN PATENT DOCUMENTS

| JP | S63-259623 A | 10/1988 |
| JP | 2005-91939 A | 4/2005 |

(Continued)

OTHER PUBLICATIONS

International Preliminary Report on Patentability for International Application No. PCT/JP2012/002053, issued by the International Bureau of WIPO on Nov. 28, 2013.

(Continued)

*Primary Examiner* — Phu Vu

(57) ABSTRACT

Provided is an optical diffraction element that restricts overall thickness of the element while maintaining strength. The optical diffraction element comprises a substrate; an orientation layer that is formed on one surface of the substrate and includes anisotropic polymers that are oriented perpendicular to or inclined relative to a surface of the substrate in at least a partial region of the orientation layer; and a liquid crystal layer formed on the orientation layer. The liquid crystal layer includes a plurality of orientation patterns that are formed periodically and include liquid crystal molecules having different orientation directions, and the orientation direction for at least some of the orientation patterns is perpendicular to or inclined relative to the surface of the substrate, as a result of aligning with the orientation of the orientation layer formed on a bottom surface of the orientation patterns.

5 Claims, 13 Drawing Sheets

(51) Int. Cl.
*G11B 7/1353* (2012.01)
*G11B 7/1365* (2012.01)

(56) References Cited

FOREIGN PATENT DOCUMENTS

| | | |
|---|---|---|
| JP | 2006-189695 A | 7/2006 |
| JP | 2006-243025 A | 9/2006 |
| JP | 2006-252638 A | 9/2006 |
| JP | 2008-21368 A | 1/2008 |
| JP | 2009-25732 A | 2/2009 |
| WO | 2010/090184 A1 | 8/2010 |

OTHER PUBLICATIONS

Office Action issued for counterpart Japanese Application 2013-516174, issued by Japanese Paten Office on Sep. 15, 2015.
International Search Report for International Application No. PCT/JP2012/002053, issued by the Japanese Patent Office on Apr. 24, 2012.
Office Action issued for counterpart Korean Application 10-2013-7030535, issued by the Korean Patent Office on Oct. 29, 2014.
Office Action issued for counterpart Japanese Application 2013-516174, issued by Japan Patent Office on Mar. 8, 2016.

* cited by examiner

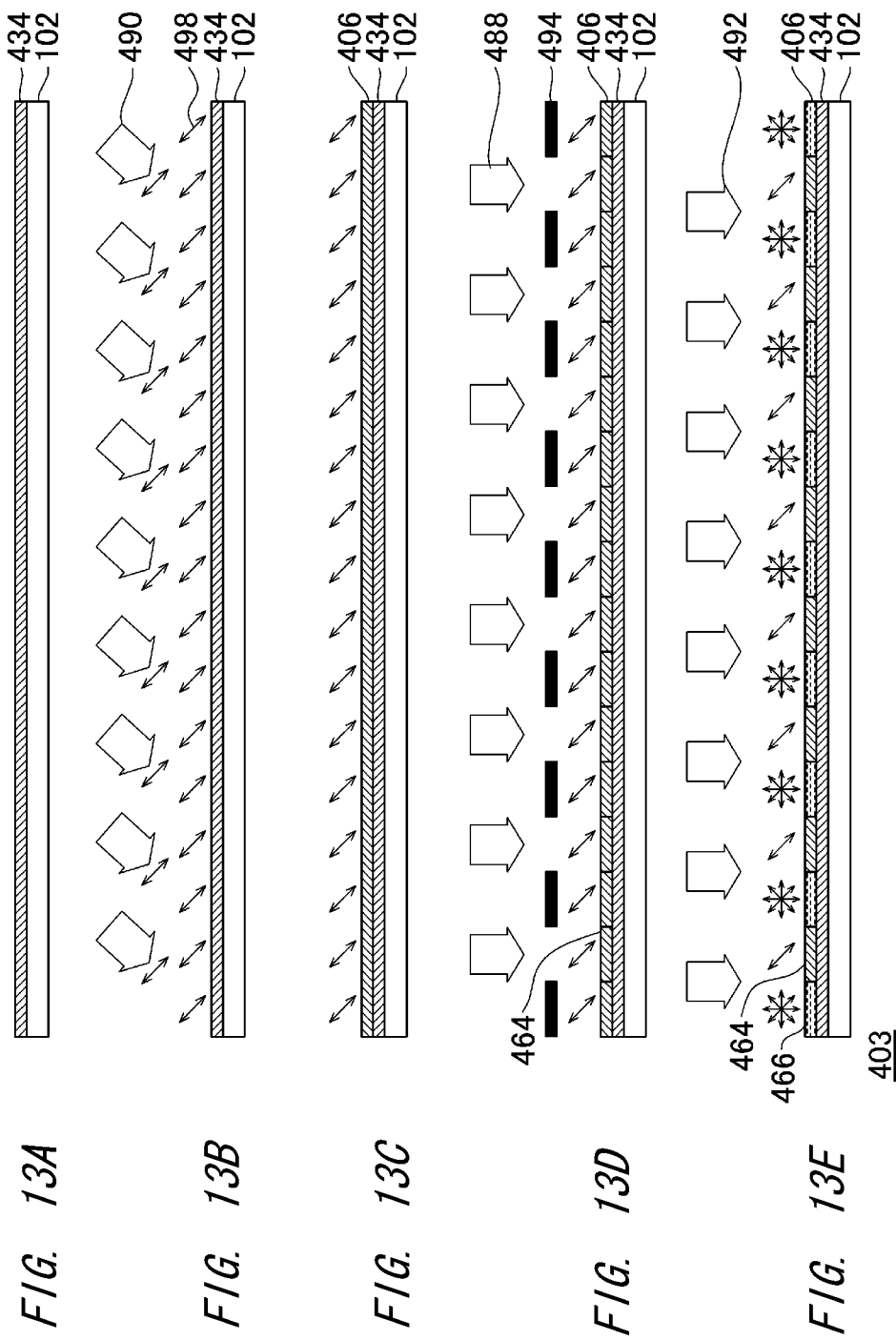

OPTICAL DIFFRACTION ELEMENT, OPTICAL PICKUP, AND OPTICAL DIFFRACTION ELEMENT MANUFACTURING METHOD

The contents of the following Japanese patent application and PCT application are incorporated herein by reference:
No. 2011-113966 filed on May 20, 2011, and
No. PCT/JP2012/002053 filed on Mar. 23, 2012.

BACKGROUND

1. Technical Field

The present invention relates to an optical diffraction element having different diffraction efficiencies due to the polarization direction of incident light, an optical pickup using the optical diffraction element, and a method of manufacturing the optical diffraction element.

2. Related Art

An optical diffraction element has many uses, and is often used in an optical pickup that reads data from an optical storage medium such as a CD, DVD, or Blu-ray (Registered Trademark).

Patent Document 1 discloses a diffraction element. This diffraction element includes a substrate in which recessed portions are formed periodically in one surface via etching. In this diffraction element, the laser light is diffracted and separated by the regions in which the recessed portions are formed and the other regions.

Patent Document 1: Japanese Patent Application Publication No. 2008-21368

However, in the substrate of the diffraction element described above, the region where the recessed portions are formed is thin, and therefore the thickness is increased in order to maintain enough strength. Furthermore, in order to prevent light from returning to the laser, the diffraction element uses a polarization filter and a half-wave plate affixed thereto. As a result of affixing these components, the overall apparatus in which the diffraction element is included becomes larger, which is a problem.

SUMMARY

Therefore, in order to solve the problems described above, according to a first aspect of the present invention, provided is an optical diffraction element comprising a substrate; an orientation layer that is formed on one surface of the substrate and includes anisotropic polymers that are oriented perpendicular to or inclined relative to a surface of the substrate in at least a partial region of the orientation layer; and a liquid crystal layer formed on the orientation layer. The liquid crystal layer includes a plurality of orientation patterns that are formed periodically and include liquid crystal molecules having different orientation directions, and the orientation direction for at least some of the orientation patterns is perpendicular to or inclined relative to the surface of the substrate, as a result of aligning with the orientation of the orientation layer formed on a bottom surface of the orientation patterns.

According to a second aspect of the present invention, provided is an optical pickup comprising a laser that outputs polarized light; an optical diffraction element that receives the polarized light emitted from the laser; a beam splitter that splits polarized light from the optical diffraction element and reflected light from a target object; and a light receiving element that receives the reflected light resulting from the splitting by the beam splitter. The optical diffraction element includes an optical filter diffraction element that is arranged to receive the polarized light from the laser and pass the polarized light from the laser without diffracting the polarized light; a half-wave layer that rotates a polarization direction of incident light by 90°; and a splitting optical diffraction layer that diffracts incident light. The optical filter diffraction element includes a substrate; an orientation layer that is formed on one surface of the substrate and includes anisotropic polymers that are oriented perpendicular to or inclined relative to a surface of the substrate in at least a partial region of the orientation layer; and a liquid crystal layer formed on the orientation layer. The liquid crystal layer includes a plurality of orientation patterns that are formed periodically and include liquid crystal molecules having different orientation directions, and the orientation direction for at least some of the orientation patterns is perpendicular to or inclined relative to the surface of the substrate, as a result of aligning with the orientation of the orientation layer formed on a bottom surface of the orientation patterns.

According to a third aspect of the present invention, provided is a method of manufacturing an optical diffraction element, comprising forming an optical orientation layer that includes anisotropic polymers on one surface of a substrate; irradiating a partial region of the optical orientation layer with first linearly polarized light from a direction normal to the surface of the substrate, such that the polymers are oriented in a polarization direction of the linearly polarized light parallel to the substrate; irradiating the entire surface of the optical orientation layer from a direction inclined relative to the surface of the substrate with second linearly polarized light that has lower intensity than the first linearly polarized light and a polarization direction parallel to that of the first linearly polarized light, such that the polymers that are not in the partial region are oriented at an incline relative to the surface of the substrate; applying on the optical orientation layer a polymeric liquid crystal solution that includes polymeric liquid crystal molecules; and hardening the polymeric liquid crystal molecules through polymerization.

According to a fourth aspect of the present invention, provided is a method of manufacturing an optical diffraction element, comprising forming an optical orientation layer that includes anisotropic polymers on one surface of a substrate; irradiating the entire surface of the optical orientation layer from a direction inclined relative to the surface of the substrate with linearly polarized light, such that the polymers are oriented at an incline relative to the surface of the substrate; applying on the optical orientation layer a polymeric liquid crystal solution that includes polymeric liquid crystal molecules; hardening a portion of the applied polymeric liquid crystal molecules through polymerization; and heating the substrate to a temperature greater than or equal to the isotropic phase transition temperature of the polymeric liquid crystal molecules, such that the remaining portion of polymeric liquid crystal molecules that were not hardened become hardened in an isotropic phase state.

The summary clause does not necessarily describe all necessary features of the embodiments of the present invention. The present invention may also be a sub-combination of the features described above.

BRIEF DESCRIPTION OF THE DRAWINGS

FIG. 13A shows a step in a method for manufacturing the optical diffraction element according to the fourth embodiment.

FIG. 13B shows a step in a method for manufacturing the optical diffraction element 403 according to the fourth embodiment.

FIG. 13C shows a step in a method for manufacturing the optical diffraction element 403 according to the fourth embodiment.

FIG. 13D shows a step in a method for manufacturing the optical diffraction element 403 according to the fourth embodiment.

FIG. 13E shows a step in a method for manufacturing the optical diffraction element 403 according to the fourth embodiment.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
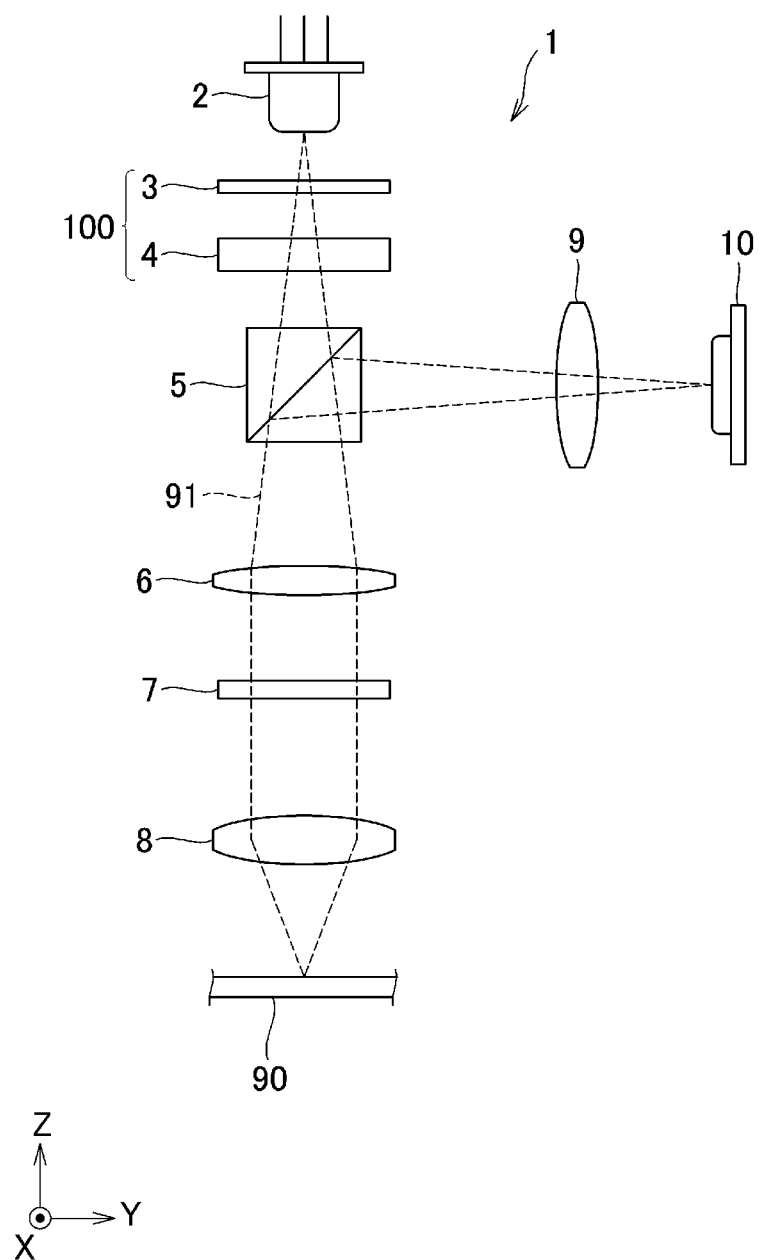
FIG. 1 shows an overall configuration of an optical pickup.

FIG. 1 shows an overall configuration of an optical pickup. The directions shown by the arrows in FIG. 1 represent the X, Y, and Z directions. The X direction is a direction that comes out from the plane of the drawing toward the viewer.

As shown in FIG. 1, the optical pickup 1 reads information that is recorded onto a target optical storage medium 90, such as a CD, DVD, or Blu-ray (Registered Trademark), by radiating light onto the optical storage medium 90. The optical pickup 1 includes a laser 2, an optical diffraction element 100 having an optical filter diffraction element 3 and a splitting optical diffraction element 4, a polarization beam splitter 5, a collimating lens 6, a quarter-wave plate 7, an objective lens 8, a light collecting section 9, and a light receiving element 10. The path of the light 91 from the laser 2 to the optical storage medium 90 is referred to as the forward path, and the path of the light 91 from the optical storage medium 90 to the light receiving element 10 is referred to as the return path.

The laser 2 emits the light 91 for input to the splitting optical diffraction element 4 and the like in the −Z direction. The light 91 emitted from the laser 2 is linearly polarized laser light with a polarization direction in the ±Y direction. The wavelength of this laser light is 787 nm if the optical storage medium 90 is a CD, 655 nm if the optical storage medium 90 is a DVD, and 405 nm if the optical storage medium 90 is a Blu-ray (Registered Trademark), for example.

The optical filter diffraction element 3 is arranged downstream of the laser 2 in the forward path of the light 91, and receives the polarized light emitted from the laser 2. The optical filter diffraction element 3 passes polarized light having a polarization direction in the ±Y direction and diffracts polarized light with a polarization direction in the ±X direction. Since the polarization direction of the light 91 in the forward path emitted from the laser 2 is the ±Y direction, the optical filter diffraction element 3 passes the forward-path light 91 without diffracting this light. A more detailed explanation of the optical filter diffraction element 3 is provided further below.

The optical filter diffraction element 3 is formed as a rectangular plate that is flat in the XY plane. The optical filter diffraction element 3 can instead be formed as a square, a rectangle, or a four-sided parallelogram. In particular, by forming the optical filter diffraction element 3 as a rectangle or four-sided parallelogram, the orientation of the optical axis can be easily recognized when assembling the device, thereby enabling assembly in an a precise direction.

The splitting optical diffraction element 4 is arranged downstream of the optical filter diffraction element 3 in the forward path of the light 91. The splitting optical diffraction element 4 includes a half-wave layer functioning as a half-wave plate and a splitting optical diffraction layer that diffracts incident light regardless of the polarization direction. The forward-path light 91 incident to the splitting optical diffraction element 4 has the polarization direction thereof rotated by 90° by the half-wave layer, and is emitted as light polarized in the ±X direction. Next, the forward-path light 91 is diffracted by the optical diffraction layer of the splitting optical diffraction element 4 and is split into three directions, for example, to be emitted as O-order light and ±1$^{st}$ order light. The light 91 split into these three directions is used in three-beam tracking to align the O-order light.

The polarization beam splitter 5 is arranged downstream of the splitting optical diffraction element 4 in the forward path of the light 91. The polarization beam splitter 5 passes the light polarized in the ±X direction, and reflects the light polarized in the ±Y direction. The polarization direction of the light 91 passed by the splitting optical diffraction element 4 and input to the polarization beam splitter is the ±X direction. Accordingly, the polarization beam splitter 5 passes the forward-path light 91.

The collimating lens 6 is arranged downstream of the polarization beam splitter 5 in the forward path of the light 91. The collimating lens 6 converts the expanding light input from the polarization beam splitter 5 into collimated light.

The quarter-wave plate 7 is arranged downstream of the collimating lens 6 in the forward path of the light 91. The quarter-wave plate 7 converts linearly polarized light into circularly polarized light, and converts circularly polarized light into linearly polarized light. Accordingly, the quarter-wave plate 7 converts the forward-path light 91, which is linearly polarized light input from the collimating lens 6, into circularly polarized light.

The objective lens 8 is arranged downstream of the quarter-wave plate 7 in the forward path of the light 91. In the forward path, the objective lens 8 focuses the substantially collimated light 91 onto the optical storage medium 90.

The forward-path light 91 that progresses in the −Z direction is reflected by the optical storage medium 90, and therefore then progresses in the +Z direction. Since the optical storage medium 90 is a fixed end, the rotation direction of the circularly polarized forward-path light 91 is reversed upon being reflected by the optical storage medium 90. Furthermore, the return-path light 91 resulting from the reflection by the optical storage medium 90 is input to the quarter-wave plate 7 and then output after being converted into linearly polarized light that is polarized in the ±Y direction. The return-path light 91 output from the quarter-wave plate 7 is polarized in the ±Y direction, and is therefore reflected in the +Y direction by the polarization beam splitter 5.

The light collecting section 9 is arranged downstream in the path of the light 91 that has been reflected by the polarization beam splitter 5, i.e. on the +Y-direction side of the polarization beam splitter 5 in FIG. 1. The light collecting section 9 can be formed by one or more lenses, such as a cylindrical lens or concave lens. The light collecting section 9 focuses the light 91 that has been reflected in the +Y direction by the polarization beam splitter 5 onto the light receiving element 10.

The light receiving element 10 is arranged downstream of the light collecting section 9 in the path of the light 91. The light receiving element 10 receives the return-path light 91 that is focused by the light collecting section 9. The light receiving element 10 converts the received light 91 into an electrical signal, and outputs this electrical signal.

Here, a portion of the return-path light 91 that is input to the polarization beam splitter 5 and polarized in the ±Y direction is passed in the +Z direction as leaked light, without being reflected in the +Y direction by the polarization beam splitter 5. This leaked light is incident to the half-wave layer of the splitting optical diffraction element 4, and therefore has its polarization direction rotated by 90° to be in the ±X direction. The leaked light that has been polarized in the ±X direction is incident to the optical filter diffraction element 3 and diffracted. Accordingly, the leaked light that is polarized in the ±X direction and incident to the optical filter diffraction element 3 is diffracted immediately in front of the laser 2, and therefore does not enter into the laser 2.

Figure 2A:
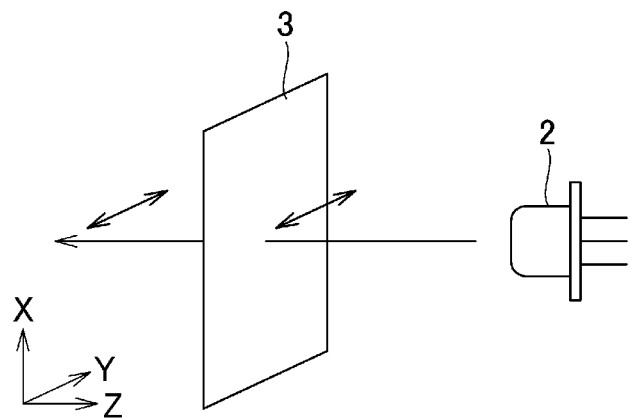
FIG. 2A shows a case where light polarized in the ±Y direction is incident to the optical filter diffraction element 3.
Figure 2B:
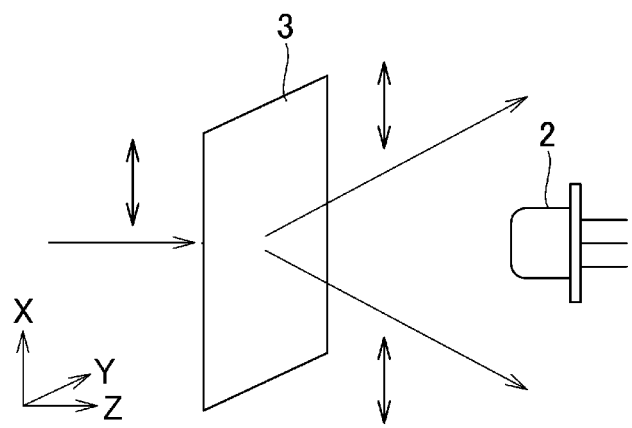
FIG. 2B shows a case where light polarized in the ±X direction is incident to the optical filter diffraction element 3.

FIGS. 2A and 2B show operation of the optical filter diffraction element 3 of the optical pickup shown in FIG. 1. FIG. 2A shows a case where light polarized in the ±Y direction is incident to the optical filter diffraction element 3. FIG. 2B shows a case where light polarized in the ±X direction is incident to the optical filter diffraction element 3. As shown in FIGS. 2A and 2B, the optical filter diffraction element 3 passes the light polarized in the ±Y direction, and diffracts the light polarized in the ±X direction. In this way, the optical pickup using the optical filter diffraction element 3 can prevent a portion of the return-path light 91 from entering into the laser 2, and can therefore stabilize the output of the laser 2.

Figure 3:
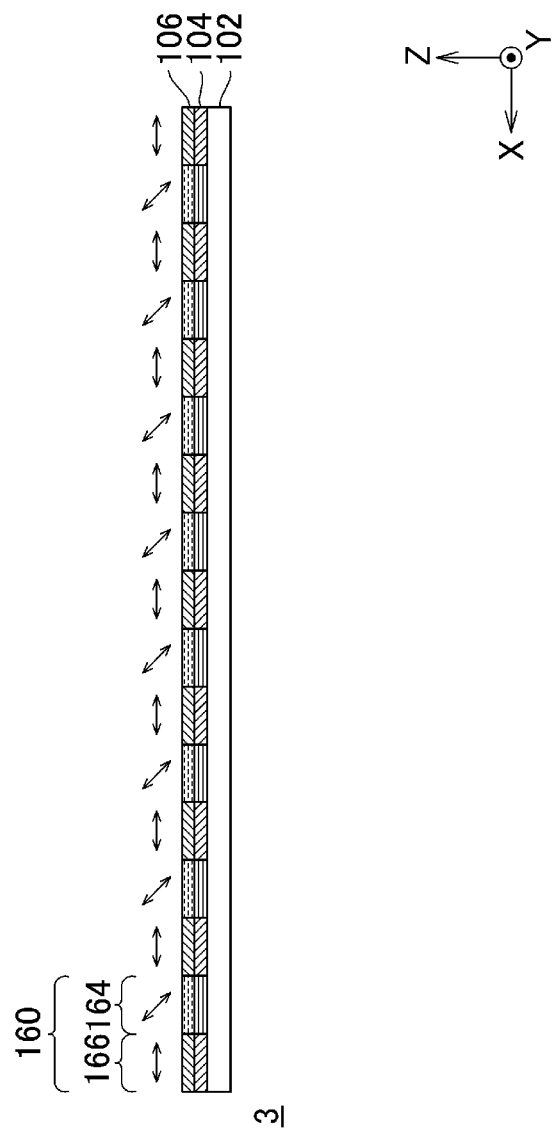
FIG. 3 is a cross-sectional view of the optical filter diffraction element 3 shown in FIG. 1.
Figure 4:
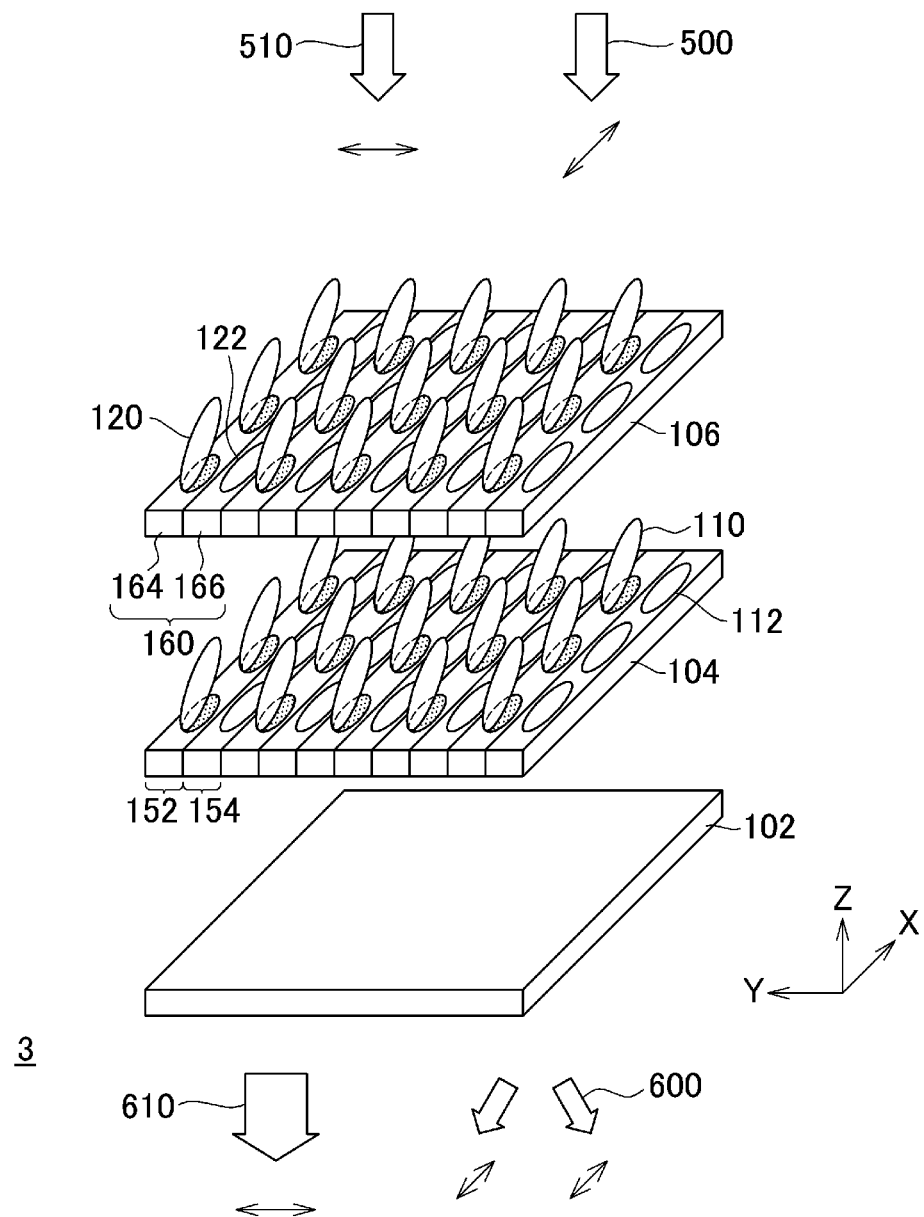
FIG. 4 is a perspective view of the optical filter diffraction element 3.

FIG. 3 is a cross-sectional view of the optical filter diffraction element 3 shown in FIG. 1. FIG. 4 is a perspective view of the optical filter diffraction element 3. The optical diffraction element 100 according to the present embodiment includes a substrate 102, an orientation layer 104 formed on one surface of the substrate 102, and a liquid crystal layer 106 formed on the orientation layer 104.

The substrate 102 holds the orientation layer 104 and the liquid crystal layer 106. The substrate 102 has a substantially uniform thickness over its entirety. For example, the substrate 102 may have a rectangular shape with dimensions of 2 mm to 5 mm by 2 mm to 5 mm. The substrate 102 is formed by transparent glass with a high transmittance for the wavelength of the laser light. The substrate 102 may be formed of a transparent material such as resin that includes glass fibers, a resin board, or a resin film. In particular, when the substrate 102 is formed by a material including glass fibers, the strength, workability, and the like can be improved.

The orientation layer 104 is formed on one surface of the substrate 102, and can orient the liquid crystal molecules 120 and 122 of the liquid crystal layer 106. The orientation layer 104 includes anisotropic polymers 110 and 112, and the liquid crystal molecules 120 and 122 included in the liquid crystal layer 106 are oriented in alignment with to the orientation directions of the polymers 110 and 112. The orientation layer 104 may be an optical orientation layer in which the orientation is induced by linearly polarized light. For example, the optical orientation layer may be a UV-cured resin, and may include optically oriented polymers such as photolytic, optically double-quantum, or optically anisotropic types. The orientation layer 104 has a thickness of approximately 0.01µ to 1 µm, for example.

The orientation layer 104 includes a polymer orientation region 152 and a polymer orientation region 154, which have different inclinations of orientation directions relative to the surface, i.e. different angles of elevation for the orientation directions relative to the surface direction. The polymer orientation region 152 includes the polymers 110 that are oriented at an angle relative to the surface of the substrate 102. The polymer orientation region 154 includes the polymers 112 that are oriented parallel to the surface of the substrate 102.

The polymers 110 of the polymer orientation regions 152 are oriented in the ±X direction. Furthermore, the polymers 112 of the polymer orientation regions 154 are oriented in the ±X direction within a plane projected to be parallel with the substrate 102. In other words, within a plane parallel to the substrate 102, the orientation direction of the polymer orientation region 152 is parallel to the orientation direction of the polymer orientation region 154.

The polymer orientation region 152 and the polymer orientation region 154 are each arranged as stripes extending in the ±X direction. Furthermore, the polymer orientation region 152 and polymer orientation region 154 are arranged as stripes formed in an alternating manner in the ±Y direction. In the present embodiment, the arrangement direction of the polymer orientation region 152 and the polymer orientation region 154 in the orientation layer 104 is orthogonal to the orientation direction of the polymers 110 and 112 of the orientation layer 104 within the plane.

The liquid crystal layer 106 is positioned on top of the orientation layer 104, and diffracts the light incident to the optical filter diffraction element 3. The liquid crystal molecules 120 and 122 of the liquid crystal layer 106 are oriented in accordance with the orientation direction of the orientation layer 104. The liquid crystal layer 106 has a plurality of orientation patterns 160 in which the orientation directions of the liquid crystal molecules 120 and 122 are different. In the present embodiment, the plurality of orientation patterns 160 includes an inclined orientation pattern 164 and a parallel orientation pattern 166. By periodically repeating the plurality of orientation patterns 160, the liquid crystal layer 106 functions as a diffraction element. The liquid crystal layer 106 is formed from the liquid crystal molecules 120 and 122 that are identical but have different orientation directions. The liquid crystal layer 106 may have a thickness of approximately 0.5 μm to 20 μm, for example.

The liquid crystal molecules 120 of the inclined orientation pattern 164 are oriented at an angle relative to the surface of the substrate 102, in accordance with the polymers 110 of the orientation layer 104 formed therebelow. The liquid crystal molecules 122 of the parallel orientation pattern 166 are oriented parallel to the surface of the substrate 102, in accordance with the polymers 112 of the orientation layer formed therebelow.

The liquid crystal molecules 120 of the inclined orientation pattern 164 are oriented in the ±X direction. Furthermore, the liquid crystal molecules 122 of the parallel orientation pattern 166 are arranged in the ±X direction within a projected plane parallel to the substrate 102. In other words, within a plane parallel to the substrate 102, the orientation direction of the polymer orientation regions 152 and the orientation direction of the polymer orientation regions 154 are parallel.

The inclined orientation pattern 164 and the parallel orientation pattern 166 are formed as stripes extending in the ±X direction. Furthermore, the inclined orientation pattern 164 and the parallel orientation pattern 166 are arranged periodically in the ±Y direction. In the present embodiment, the arrangement direction of the inclined orientation pattern 164 and parallel orientation pattern 166 is orthogonal to the orientation direction of the liquid crystal molecules 120 and 122 of the liquid crystal layer 106 in the plane.

Figure 5A:
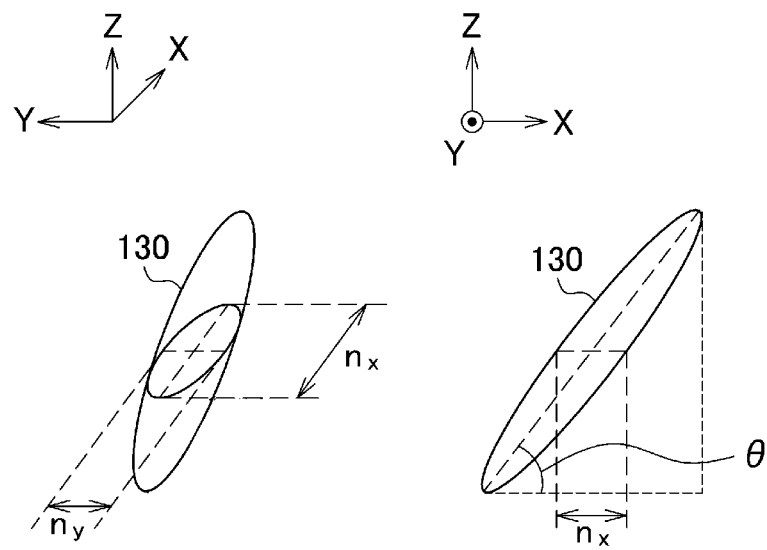
FIG. 5A shows a refractive index elliptical body 130 of a liquid crystal molecule 120 included in the inclined orientation pattern 164.
Figure 5B:
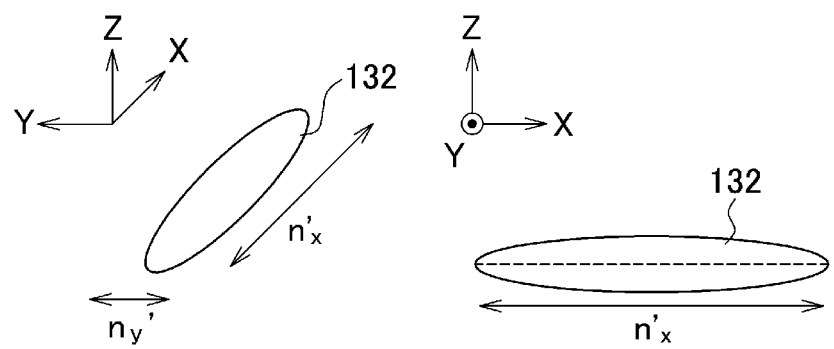
FIG. 5B shows a refractive index elliptical body 132 of a liquid crystal molecule 122 included in the parallel orientation pattern 166.

FIGS. 5A and 5B show refractive index elliptical bodies 130 and 132 of the liquid crystal molecules 120 and 122 in the first embodiment. FIG. 5A shows a refractive index elliptical body 130 of a liquid crystal molecule 120 included in the inclined orientation pattern 164. FIG. 5B shows a refractive index elliptical body 132 of a liquid crystal molecule 122 included in the parallel orientation pattern 166.

The liquid crystal molecules 120 and 122 exhibit axial refractive index anisotropy. The ordinary refractive index $n_o$ of the liquid crystal molecules 120 and 122 is the short axis of the refractive index elliptical bodies 130 and 132, and the extraordinary refractive index $n_e$ of the liquid crystal molecules 120 and 122 is the long axis of the refractive index elliptical bodies 130 and 132. The planar refractive index of the liquid crystal molecules 120 and 122 within the plane of the substrate 102 is represented by a cross section that is parallel to the surface of the substrate 102 and passes through the center of the refractive index elliptical bodies 130 and 132.

As shown in FIG. 5A, the refractive index elliptical body 130 of the liquid crystal molecule 120 in the inclined orientation pattern 164 has an elevation angle θ relative to the surface direction of the substrate 102. As a result, the inclined orientation pattern 164 including the liquid crystal molecules 120 has a refractive index $n_x$ in the delayed phase axis direction and a refractive index $n_y$ in the advanced phase axis direction within the plane parallel to the substrate 102.

The refractive index $n_x$ is the maximum refractive index within the plane, and the refractive index $n_y$ is the minimum refractive index. Here, $n_x$ increases and decreases according to the elevation angle θ indicating the inclination of the refractive index elliptical body 130 of the liquid crystal molecule 120, but $n_y$ is a value that remains constant regardless of the elevation angle θ. Furthermore, $n_x$ is at a minimum and equal to $n_y$ when the elevation angle θ is 90°, and increases as the elevation angle θ decreases. In the present embodiment, the elevation angle θ need only be greater than 0° and no greater than 90°, but can be set to a range from 20° to 90°, for example. When the elevation angle θ is greater than 0° and no greater than 90°, $n_x'$ is greater than $n_x$.

As shown in FIG. 5B, the refractive index elliptical body 132 of the liquid crystal molecule 122 in the parallel orientation pattern is arranged parallel to the surface of the substrate 102. The parallel orientation pattern including the liquid crystal molecules 122 has a refractive index $n_x'$ in the delayed phase axis direction and a refractive index $n_y'$ in the advanced phase axis direction within the plane. The refractive index elliptical body 130 of the liquid crystal molecule 122 has an elevation angle θ of 0°, and the refractive index $n_x'$ in the delayed phase axis direction is equal to the extraordinary refraction index $n_e$ of the liquid crystal molecule 120. Furthermore, $n_y'$ and $n_y$ are equal to the ordinary refractive index $n_o$ of the liquid crystal molecules 120 and the liquid crystal molecules 122.

The following describes the diffraction principles of the light incident to the optical filter diffraction element 3. As shown in FIG. 4, the X-direction linearly polarized light 500 incident to the optical filter diffraction element 3 passes through each of the inclined orientation pattern 164 and the parallel orientation pattern 166 of the liquid crystal layer 106. At this time, due to the difference between the refractive index $n_x$ of the inclined orientation pattern 164 and the refractive index $n_x'$ of the parallel orientation pattern 166, the X-direction linearly polarized light 500 is diffracted by the liquid crystal layer 106 and emitted as diffracted light 600.

On the other hand, the Y-direction linearly polarized light 510 incident to the optical filter diffraction element 3 is passed by each of the inclined orientation pattern 164 and the parallel orientation pattern 166, but since the refractive index $n_y$ of the inclined orientation pattern 164 is equal to the refractive index $n_y'$ of the parallel orientation pattern 166, the Y-direction linearly polarized light 510 is not diffracted and is emitted as transmitted light 610.

The diffraction efficiency in each polarization direction can be controlled by adjusting the phase difference of the optical filter diffraction element 3 in each direction. In the present embodiment, the phase difference when the Y-direction linearly polarized light 510 is incident to the optical filter diffraction element 3 is 0. The phase difference when the X-direction linearly polarized light 500 is incident to the optical filter diffraction element 3 can be calculated as $(n_e-n_x) \times d$. Here, d is the thickness of the liquid crystal layer 106.

Since $n_x$ is determined by the liquid crystal molecules used and the elevation angle, by appropriately setting the type of liquid crystal molecules 120 and 122 used, the thickness of the liquid crystal layer 106, and the elevation angle, the optical filter diffraction element 3 can independently control the first order diffraction efficiency of the X-direction linearly polarized light 500.

In this way, the optical filter diffraction element 3 of the optical diffraction element 100 according to the present invention can pass or diffract the incident light according to the polarization direction of this light. In other words, the optical diffraction element 100 can cause different diffraction efficiencies according to the polarization direction of the incident light.

Figure 6:
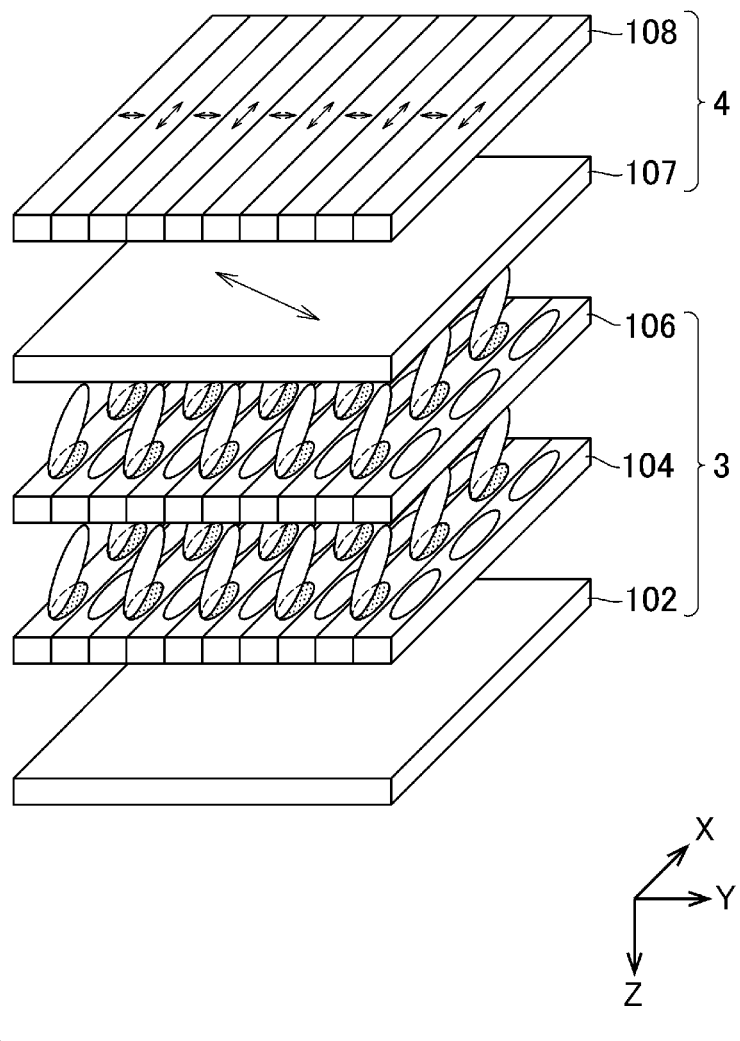
FIG. 6 shows an optical diffraction element 101 according to a modification of the first embodiment.

FIG. 6 shows an optical diffraction element 101 according to a modification of the first embodiment. The optical diffraction element 101 of the present modification includes the substrate 102, the orientation layer 104 formed on one surface of the substrate 102, the liquid crystal layer 106 formed on the orientation layer 104, the half-wave layer 107 formed on the liquid crystal layer 106, and the splitting optical diffraction layer 108. In the optical diffraction element 101, the substrate 102, the orientation layer 104, and the liquid crystal layer 106 function as the optical filter diffraction element 3 shown in FIG. 1. In the optical diffraction element 101, the half-wave layer half-wave plate 107 and the splitting optical diffraction layer 108 function as the splitting optical diffraction element 4 shown in FIG. 1.

The half-wave layer 107 is formed on the liquid crystal layer 106, and rotates the polarization direction of the linearly polarized light incident thereto by 90°. The half-wave layer 107 is a liquid crystal layer that has liquid crystal molecules oriented in one direction. The orientation direction of the liquid crystal molecules is at an angle of 45° relative to the polarization direction of the linearly polarized light incident to the half-wave layer 107. The half-wave layer 107 includes an orientation layer for orienting the liquid crystal molecules.

The splitting optical diffraction layer 108 is formed on top of the half-wave layer 107, and diffracts light incident thereto. The splitting optical diffraction layer 108 is a liquid crystal layer that includes liquid crystal molecules. The splitting optical diffraction layer 108 has a plurality of orientation patterns arranged as stripes. The plurality of orientation patterns includes two orientation patterns that are arranged in an alternating manner and have orientation patterns that are orthogonal to each other. The splitting optical diffraction layer 108 may include an orientation layer for orienting the liquid crystal molecules.

The arrangement direction of the plurality of orientation patterns arranged as alternating stripes is the ±Y direction. Instead, the arrangement direction of the plurality of orientation patterns arranged as alternating stripes may be parallel to the ±X direction.

In the present modification, in the optical diffraction element 101, the orientation layer 104, the liquid crystal layer 106, the half-wave layer 107, and the splitting optical diffraction layer 108 are formed on the substrate 102 in the stated order. Instead, the arrangement of the half-wave layer 107 and the splitting optical diffraction layer 108 may be changed in the optical diffraction element 101.

For example, the optical diffraction element 101 may include the half-wave layer 107 between the substrate 102 and the orientation layer 104, and the splitting optical diffraction layer 108 may be formed on the surface of the substrate 102 opposite the surface on which the orientation layer 104 is provided. The optical diffraction element 101 may have the half-wave layer 107 formed on the surface of the substrate 102 opposite the surface on which the orientation layer 104 is provided, and have the splitting optical diffraction layer 108 formed on the half-wave layer 107. As yet another example, the optical diffraction element 101 may include the splitting optical diffraction layer 108 and the half-wave layer 107 formed on the substrate 102 in the stated order, and may have the orientation layer 104 and the liquid crystal layer 106 formed on the half-wave layer 107.

In this way, with the optical diffraction element 101 of the present embodiment, the polarization filter, the half-wave plate, and the separating diffraction element are formed on a single substrate, and therefore the overall thickness of the element can be kept low.

FIGS. 7A to 7D show a method for manufacturing the optical filter diffraction element of the optical diffraction element according to the first embodiment. FIGS. 7A to 7D show a step of forming the optical orientation layer, a first light orientation step, a second light orientation step, a step of forming polymeric liquid crystal, and a step of hardening the liquid crystal, in the process for manufacturing the optical filter diffraction element 3 of the optical diffraction element 100.

Figure 7:
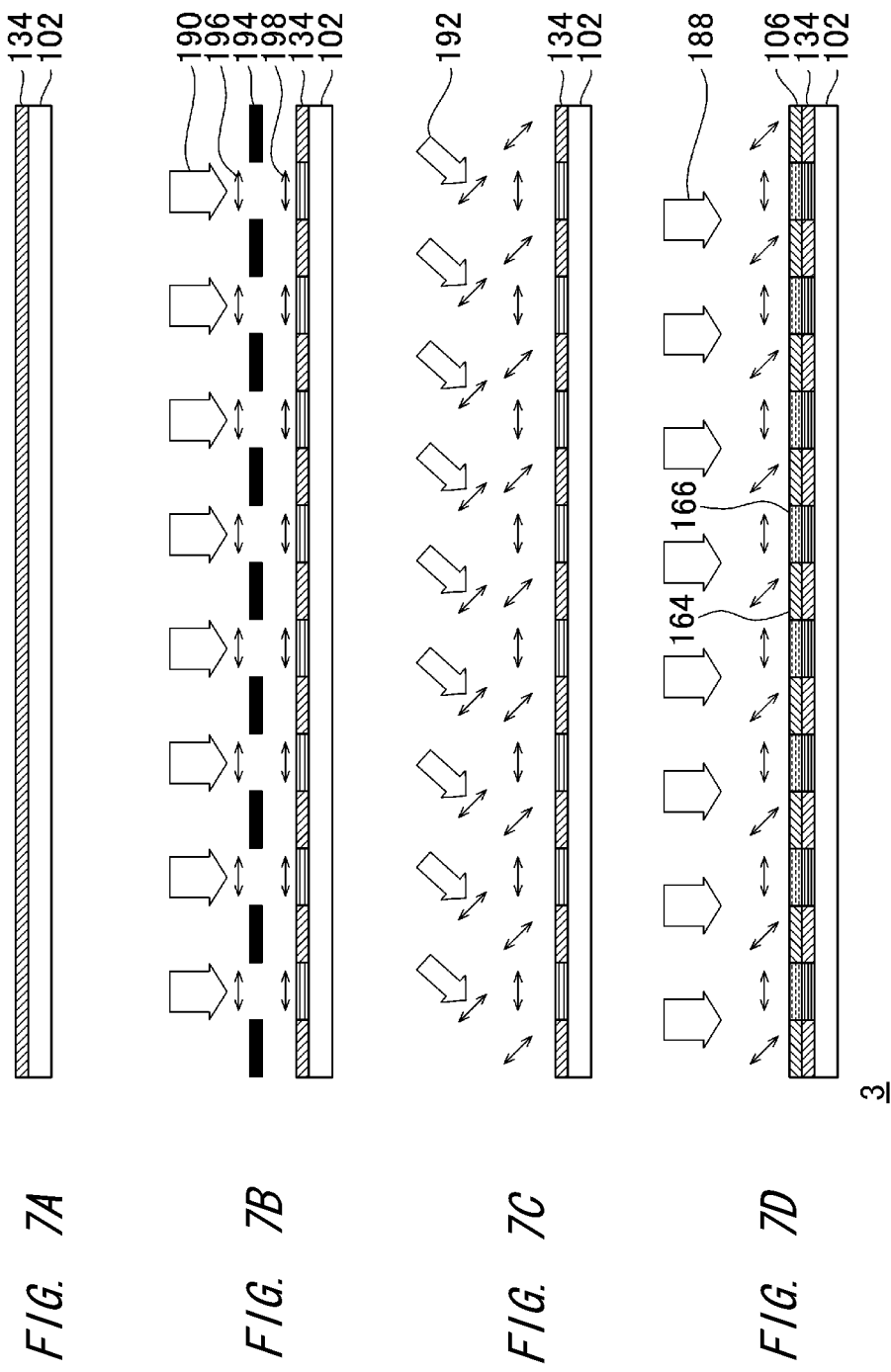
FIG. 7A shows a step in a method for manufacturing the optical filter diffraction element of the optical diffraction element according to the first embodiment
FIG. 7B shows a step in a method for manufacturing the optical filter diffraction element of the optical diffraction element according to the first embodiment
FIG. 7C shows a step in a method for manufacturing the optical filter diffraction element of the optical diffraction element according to the first embodiment
FIG. 7D shows a step in a method for manufacturing the optical filter diffraction element of the optical diffraction element according to the first embodiment

First, as shown in FIG. 7A, during the step of forming the optical orientation layer, the optical orientation layer 134 including the anisotropic polymers is formed on one surface of the substrate 102. The step of forming the optical orientation layer is a step of applying an optical double-quantum orienting material to the entirety of one surface of the transparent substrate 102 and then drying the orienting material, for example. The optical double-quantum orienting material may be UV-curable resin. The application can be realized using widely known application methods such as a roller coater, spin coater, or slit die coater.

Next, as shown in FIG. 7B, during the first light orientation step, a partial region of the optical orientation layer 134 is irradiated with the first linearly polarized light 190 from a direction normal to the surface of the substrate 102, thereby causing the anisotropic polymers in the region to be oriented in the polarization direction 196 of the linearly polarized light parallel to the substrate 102. The portion of the optical orientation layer 134 irradiated by the first linearly polarized light 190 becomes oriented in an orientation direction 198 parallel to the first linearly polarized light 190. In order to irradiate the partial region of the optical orientation layer with the first linearly polarized light 190, a photomask 194 is used.

Next, as shown in FIG. 7C, during the second light orientation step, the entire surface of the optical orientation layer 134 is irradiated with the second linearly polarized light 192, which has lower intensity than the first linearly polarized light 190 and has the same polarization direction as the first linearly polarized light 190, from a direction that is at an angle relative to the surface of the substrate 102. The portion of the optical orientation layer 134 irradiated by the second linearly polarized light 192 is oriented in an orientation direction parallel to the second linearly polarized light 192, i.e. a direction at an angle relative to the surface of the substrate 102. The intensity of the second linearly polarized light 192 is less than that of the first linearly polarized light 190, and therefore the orientation of the optical orientation layer 134 in the region irradiated by the first linearly polarized light 190 during the first light orientation step is not disturbed.

The inclination of the second linearly polarized light 192 and the inclination of the polymers have a positive correlation. Therefore, when the inclination of the inclined orientation pattern 164 to be formed later relative to the substrate 102 is desired to be greater, the inclination of the second linearly polarized light 192 relative to the substrate 102 is increased. For ease of explanation, FIG. 7C shows the second linearly polarized light 192 being radiated in a direction from the upper right, but when obtaining an optical diffraction element corresponding to the first embodiment, the second linearly polarized light 192 is radiated in a direction from the viewer or from a plane deeper than the plane of the drawing.

Next, as shown in FIG. 7D, during the step of forming the polymeric liquid crystal, a polymeric liquid crystal solution including the polymeric liquid crystal molecules is applied on the optical orientation layer 134. The step of forming the polymeric liquid crystal may include a step of applying the polymeric liquid crystal solution and then drying the solution. The applied polymeric liquid crystal molecules are oriented in accordance with the direction of the optical orientation layer 134 positioned on the bottom surface thereof. The polymeric liquid crystal solution may include polymeric liquid crystal molecules, a solvent, and a polymerization initiator. The polymeric liquid crystal molecules are hardened as a result of polymerization through heating or light irradiation.

The suitable material to be used in the polymeric liquid crystal molecules is selected according to the intended use of the optical filter diffraction element 3 and the wavelength of the incident light, for example. The polymeric liquid crystal molecules may be rod-like liquid crystal molecules, for example. The polymeric liquid crystal molecules obey the regulative force of the optical orientation layer 134 provided therebelow, thereby becoming oriented in a direction parallel to the surface of the substrate 102 in the inclined orientation pattern 164 and becoming oriented at an angle relative to the surface of the substrate 102 in the parallel orientation pattern 166. The application can be realized using widely known application methods such as a roller coater, spin coater, or slit die coater.

Next, during the step of hardening the liquid crystal, the liquid crystal layer 106 is formed by polymerizing and hardening the polymeric liquid crystal molecules. In the present embodiment, the liquid crystal hardening step may be a step of irradiating the entire surface of the applied polymeric liquid crystal solution with exposure light 188 such as UV light that causes polymerization of the polymeric liquid crystal molecules. If the polymeric liquid crystal molecules can be polymerized through heating, the liquid crystal hardening step may include heating the polymeric liquid crystal solution.

In this way, with the manufacturing method of the present embodiment, it is possible to manufacture the optical filter diffraction element 3 of the optical diffraction element 100 in which the diffraction efficiency differs according to the polarization direction of the incident light. Furthermore, by changing the inclination of the light incident to the optical orientation layer, the diffraction efficiency of light with a prescribed polarization direction can be easily controlled.

Figure 8:
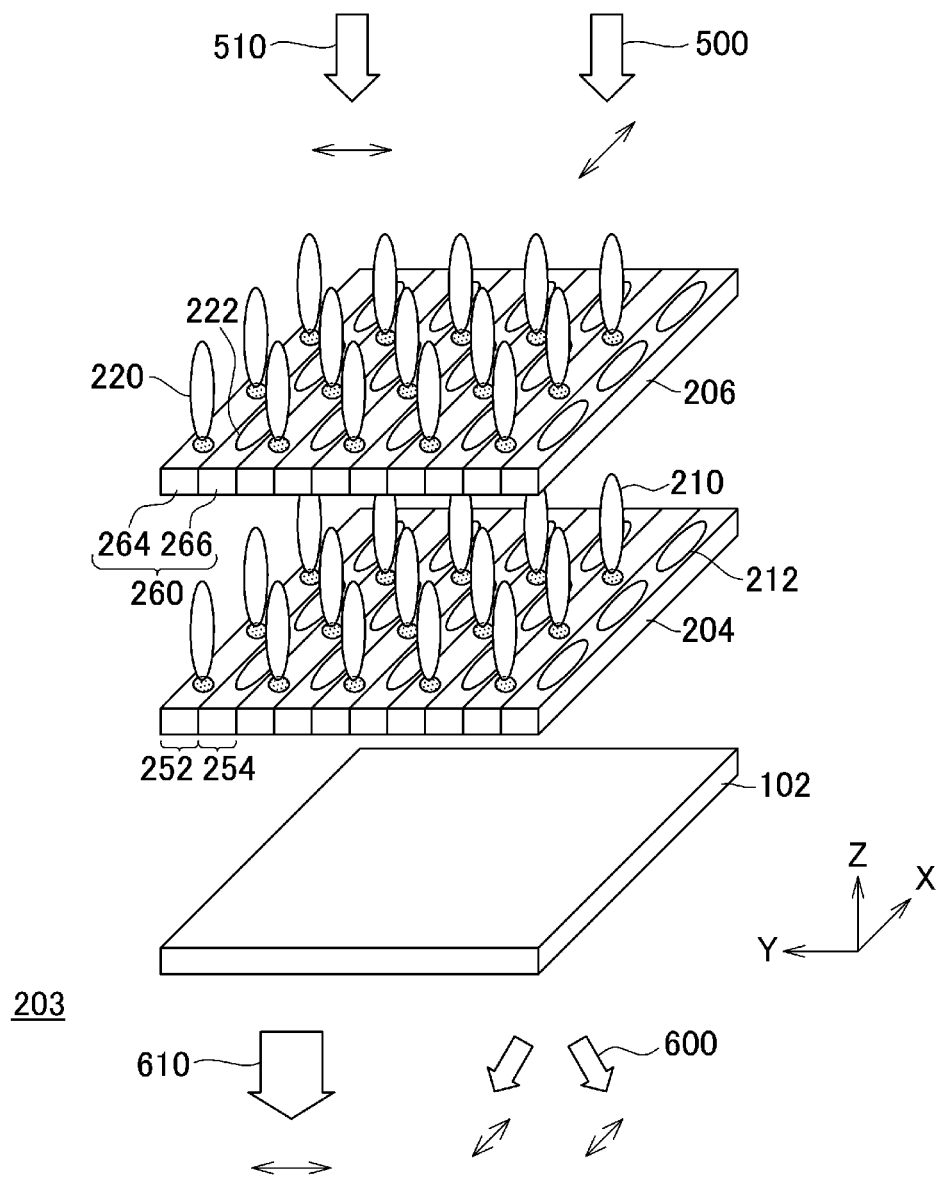
FIG. 8 is an exploded perspective view of an optical filter diffraction element 203 according to a second embodiment of the present invention.

FIG. 8 is an exploded perspective view of an optical filter diffraction element 203 according to a second embodiment of the present invention. The optical filter diffraction element 203 of the present embodiment includes a perpendicular orientation pattern 264 instead of the inclined orientation pattern 164, but is otherwise the same as the first embodiment. The perpendicular orientation pattern 264 is oriented perpendicular to the surface of the substrate 102.

In other words, in the present embodiment, the plurality of orientation patterns 260 includes a parallel orientation pattern 266 with an orientation direction parallel to the surface of the substrate 102 and a perpendicular orientation pattern 264 with an orientation direction perpendicular to the surface of the substrate 102. The parallel orientation pattern 266 is formed on top of the polymer orientation region 254 in which the anisotropic polymers 212 are oriented parallel to the surface of the substrate 102. The perpendicular orientation pattern 264 is formed on top of the polymer orientation region 252 in which the anisotropic polymers 210 are oriented vertically.

In the present embodiment as well, based on the same principles as in the first embodiment, the X-direction linearly polarized light 500 is diffracted by the liquid crystal layer 206 and emitted as the diffracted light 600, while the Y-direction linearly polarized light 510 is emitted as the transmitted light 610 without being diffracted by the liquid crystal layer 206. In this way, with the optical filter diffraction element 203 of the present embodiment, the incident light can be passed or diffracted according to the polarization direction of the incident light.

Furthermore, with the present embodiment, the difference between the refractive index in the surface of the substrate in the ±X direction of the orientation pattern including the liquid crystal molecules 220 and the refractive index in the surface of the substrate in the ±X direction of the orientation pattern including the liquid crystal molecules 222 is at a maximum, and therefore the thickness of the liquid crystal layer 206 can be kept low while still increasing the diffraction efficiency. In particular, the thickness d of the liquid crystal layer 206 that enables the maximum diffraction efficiency can be minimized when the value $(n_x'-n_x)$ in the Expression shown below is at a maximum. With $\lambda$ representing the incident wavelength and $n_x'$ and $n_x$ respectively representing the refractive indexes of adjacent orientation patterns, the thickness d capable of obtaining the maximum diffraction efficiency is expressed as shown below.

$$d = (\lambda/2) \cdot (n_x' - n_x)^{-1} \qquad \text{Expression 1:}$$

Here, if the material of the liquid crystal layer 206 is the same for each orientation pattern, $n_x'$ is at a maximum and $n_x$ is at a minimum when the liquid crystal molecules in one of the orientation patterns are parallel to the surface of the substrate 102 and the liquid crystal molecules in the other orientation pattern are perpendicular to the surface of the substrate 102. In other words, this corresponds to the state shown in FIG. 8. With the orientation patterns shown in FIG. 8, the thickness d that satisfies the above Expression achieves the maximum diffraction efficiency with the minimum thickness.

In the same manner as in the embodiment shown in FIG. 6, the optical filter diffraction element 203 may be formed as a single body including the half-wave layer 107 and the splitting optical diffraction layer 108. In this case, the polarization filter, the half-wave plate, and the separating diffraction layer are formed on a single substrate, and therefore the overall thickness of the element can be kept low.

The optical filter diffraction element 203 of the present embodiment is manufactured using the following method, for example. First, the orientation layer 204 including the anisotropic polymers is applied to the substrate 102 and then, using a photomask or the like, a partial region of the orientation layer 204 is irradiated with linearly polarized light from a direction normal to the substrate 102. The polymers in the region of the orientation layer 204 irradiated by the linearly polarized light are oriented in the same direction as the polarization direction of the linearly polarized light.

Next, the optically polymeric perpendicularly oriented liquid crystal is applied to the orientation layer 204, and then this solution is dried to form the liquid crystal layer 206. The perpendicularly oriented liquid crystals that are present in a portion of the liquid crystal layer 206 on the region of the orientation layer 204 that was irradiated with the linearly polarized light become oriented in a direction parallel to the surface of the substrate 102, in accordance with the orientation of the orientation layer 204. On the other hand, the perpendicularly oriented liquid crystals that are present in a portion of the liquid crystal layer 206 on the region of the orientation layer 204 that was not irradiated with the linearly polarized light become oriented in a direction perpendicular to the surface of the substrate 102. Next, the entire surface of the liquid crystal layer 206 is irradiated with UV light, for example, to harden the liquid crystal contained in the liquid crystal layer 206.

Figure 9:
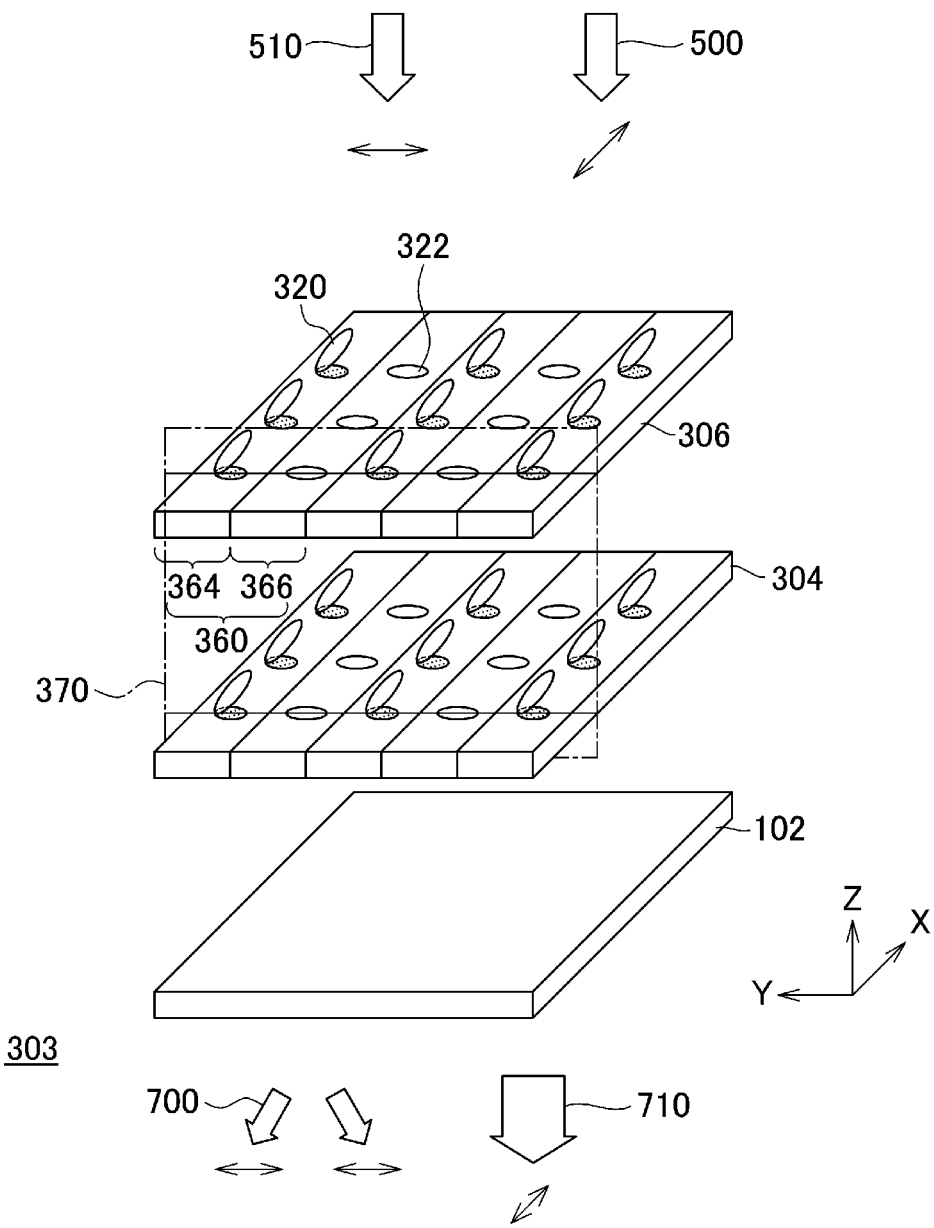
FIG. 9 is an exploded perspective view of an optical filter diffraction element 303 according to a third embodiment of the present invention.

FIG. 9 is an exploded perspective view of an optical filter diffraction element 303 according to a third embodiment of the present invention. The optical filter diffraction element 303 includes the substrate 102, an orientation layer 304, and a liquid crystal layer 306. In the optical filter diffraction element 303 of the present embodiment, the orientation directions of the liquid crystal molecules 320 of the inclined orientation pattern 364 and of the liquid crystal molecules 322 of the parallel orientation pattern 366 in the orientation patterns 360 within the plane of the substrate 102 is in the ±Y direction instead of the ±X direction, but aside from this the optical filter diffraction element 303 is the same as the first embodiment.

In the present embodiment, based on the same principles as in the first embodiment, the X-direction linearly polarized light 500 is emitted as the transmitted light 710 without being diffracted by the liquid crystal layer 306, while the Y-direction linearly polarized light 510 is diffracted by the liquid crystal layer 306 and emitted as the diffracted light 700. In this way, with the optical diffraction element 100 of the present embodiment, the polarization directions of the light that is diffracted and the light that is passed are different from the first embodiment.

Here, the orientation directions of the inclined orientation pattern 364 and the parallel orientation pattern 366 parallel to the surface of the substrate 102 are both the ±Y direction. In other words, the orientation directions of the inclined orientation pattern 364 and the parallel orientation pattern 366 are parallel to a single surface that is perpendicular to the surface of the substrate 102. When this single surface is defined as the substrate-perpendicular surface 370, the substrate-perpendicular surface 370 becomes parallel to the YZ plane (in other words, the orientation directions of the inclined orientation pattern 364 and the parallel orientation pattern 366 both become perpendicular to the X direction in FIG. 9).

The single substrate-perpendicular surface 370 in the first and second embodiment is perpendicular to the orientation direction of the orientation patterns 360. If this single substrate-perpendicular surface 370 is perpendicular or parallel to the orientation direction of the orientation patterns 360, the polarization direction of the polarized light diffracted or passed by the optical filter diffraction element 303 matches the direction in which the diffracted light expands. Furthermore, the substrate-perpendicular surface 370 may be inclined relative to the arrangement direction of the orientation patterns 360, i.e. the Y direction in FIG. 9. In other words, the orientation direction of the inclined orientation pattern 364 may be inclined relative to any one of the X, Y, and Z directions, and the orientation direction of the parallel orientation pattern 366 may be inclined relative to the X or Y direction.

In the present embodiment, the orientation directions of the orientation patterns 360 in the liquid crystal layer 306 within the plane parallel to the substrate 102 are the same, i.e. all in the ±Y direction. However, it is not necessary that planar orientation directions of all of the orientation patterns included in the liquid crystal layer 306 be the same. For example, the planar orientation direction of a certain orientation pattern may be different from the planar orientation direction of another orientation pattern. In this case as well, different diffraction efficiencies can be realized according to the polarization direction of the incident light.

In the same manner as in the embodiment shown in FIG. 6, the optical filter diffraction element 303 may be formed as a single body including the half-wave layer 107 and the splitting optical diffraction layer 108. In this case, the polarization filter, the half-wave plate, and the separating diffraction layer are formed on a single substrate, and therefore the overall thickness of the element can be kept low.

When the optical filter diffraction element 303 of the present embodiment is used in an optical pickup, the polarization direction of the laser light output by the laser may be orthogonal to the single substrate-perpendicular surface 370. The optical filter diffraction element 303 passes the polarized light orthogonal to the single substrate-perpendicular surface 370 and diffracts the polarized light parallel to the single substrate-perpendicular surface 370. Accordingly, the optical pickup including the optical filter diffraction element 303 can pass the forward-path light output from the laser and passed by the optical filter diffraction element 303, and diffract the polarized light incident from the polarization beam splitter 5 as leaked light.

Figure 10:
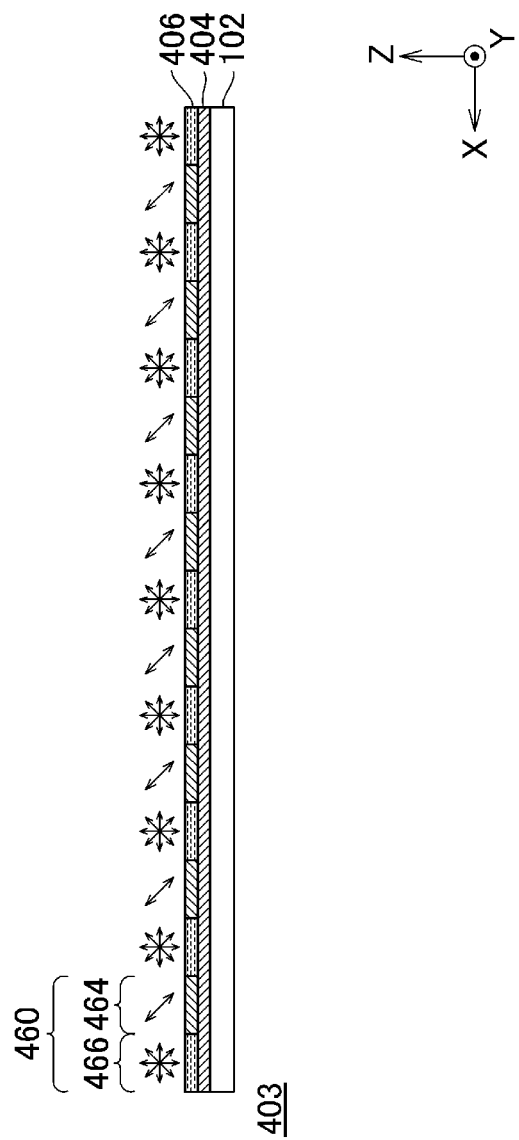
FIG. 10 is a cross-sectional view of an optical filter diffraction element 403 according to a fourth embodiment of the present invention.
Figure 11:
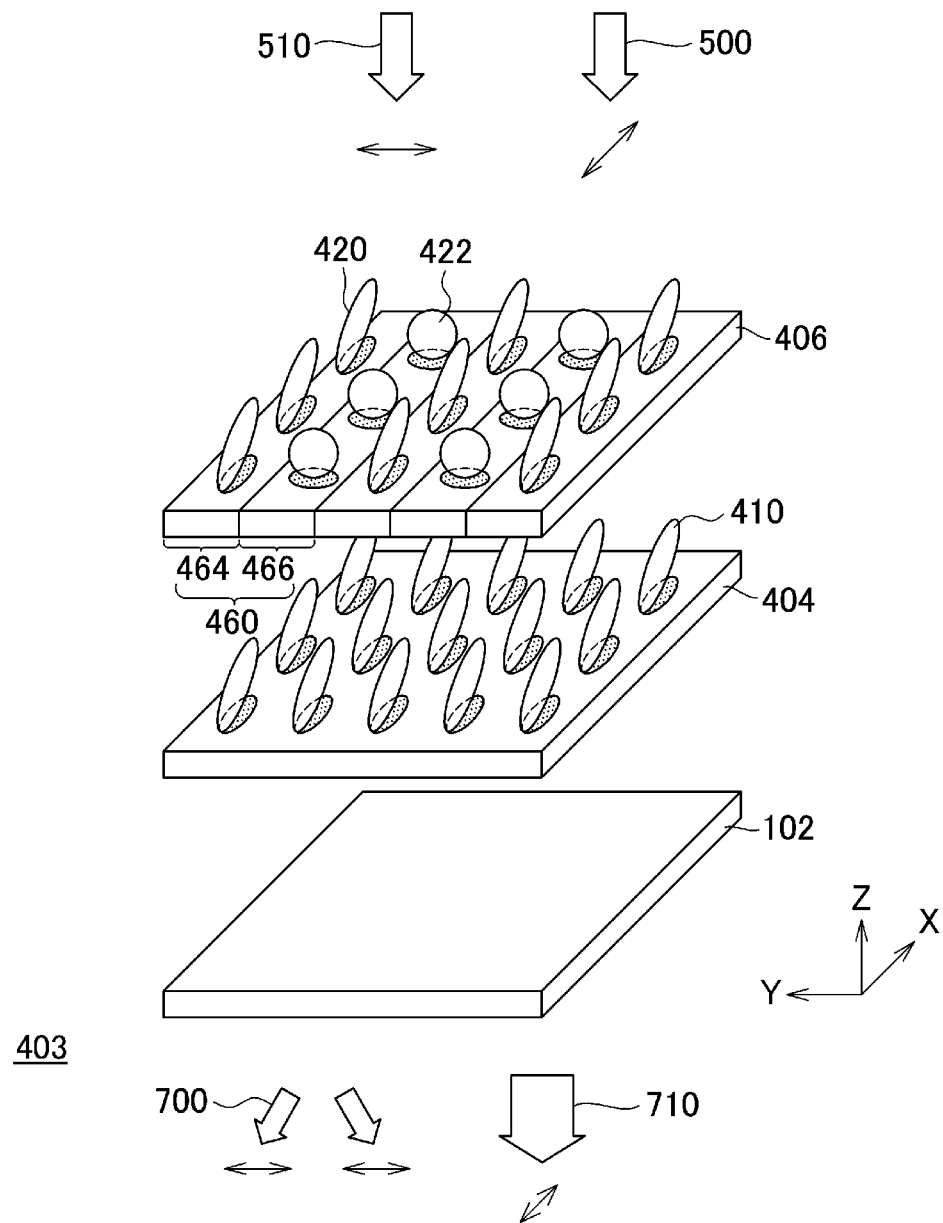
FIG. 11 is an exploded perspective view of the optical filter diffraction element 403 according to the fourth embodiment.

FIG. 10 is a cross-sectional view of an optical filter diffraction element 403 according to a fourth embodiment of the present invention. FIG. 11 is an exploded perspective view of the optical filter diffraction element 403 according to the fourth embodiment. The optical filter diffraction element 403 according to the present embodiment includes the substrate 102, an orientation layer 404, and a liquid crystal layer 406. In the optical filter diffraction element 403, the orientation layer 404 is oriented uniformly within the plane and the liquid crystal layer 406 includes an inclined orientation pattern 464 and an isotropic orientation pattern 466, but the optical filter diffraction element 403 is otherwise the same as the first embodiment.

The orientation layer 404 is formed on one surface of the substrate 102, and orients the liquid crystal of the liquid crystal layer 406 formed thereon. The orientation layer 404 has a uniform orientation of anisotropic polymers 410 over the entire surface thereof. The orientation layer 404 includes polymers 410 that are oriented at an angle relative to the surface of the substrate 102. The orientation layer 404 need not have a uniform arrangement over its entirety, such as shown in this drawing. For example, a partial region of the orientation layer 404 may have an orientation that is inclined relative to the surface of the substrate 102, and the remaining regions may have no orientation.

The liquid crystal layer 406 is positioned on top of the orientation layer 404. The liquid crystal layer 406 diffracts the light incident to the optical filter diffraction element 403. The liquid crystal layer 406 includes a plurality of orientation patterns 460. The plurality of orientation patterns 460 includes an inclined orientation pattern 464 that is oriented at an angle relative to the surface of the substrate and an isotropic orientation pattern 466 that is optically isotropic. The liquid crystal molecules 420 of the inclined orientation pattern 464 are oriented in accordance with the orientation of the polymers 410 of the orientation layer 404 formed on the bottom surface thereof, but the liquid crystal molecules 422 of the isotropic orientation pattern 466 are not oriented in accordance with the orientations of the polymers 410 of the orientation layer 404 formed on the bottom surface thereof. The inclined orientation pattern 464 is oriented in the ±X direction in the plane parallel to the substrate 102. The inclined orientation pattern 464 and the isotropic orientation pattern 466 are formed as periodic stripes whose longitudinal direction is parallel to the ±X direction.

Figure 12A:
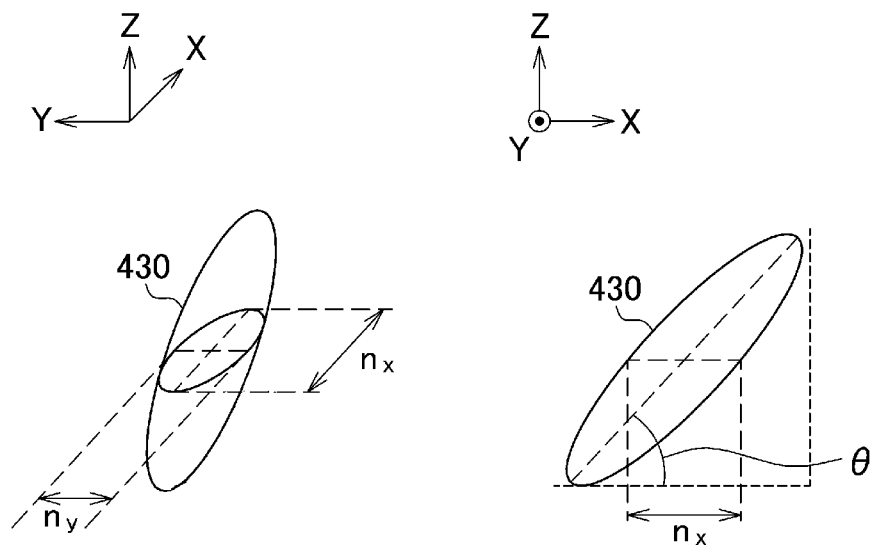
FIG. 12A shows a refractive index elliptical body 430 of a liquid crystal molecule 420 included in the inclined orientation pattern 464.
Figure 12B:
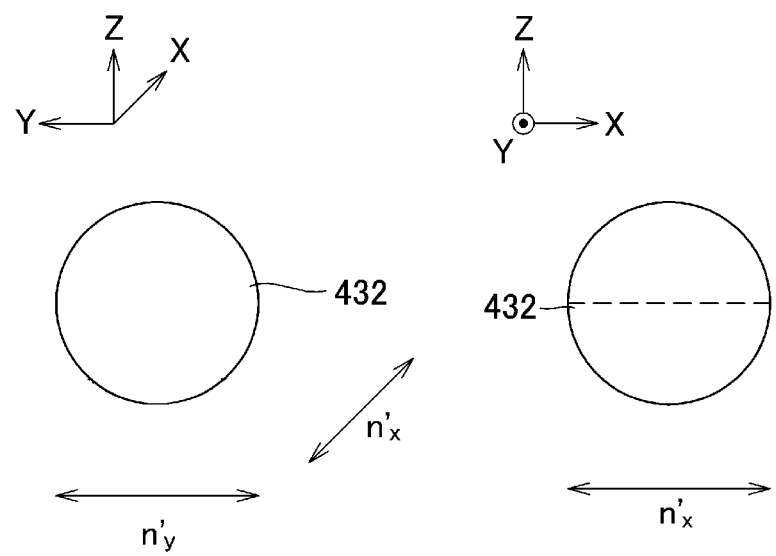
FIG. 12B shows a refractive index elliptical body 432 of a liquid crystal molecule 422 included in the isotropic orientation pattern 466.

FIGS. 12A and 12B show refractive index elliptical bodies 430 and 432 of the liquid crystal molecules 420 and 422 in the fourth embodiment. FIG. 12A shows a refractive index elliptical body 430 of a liquid crystal molecule 420 included in the inclined orientation pattern 464. FIG. 12B shows a refractive index elliptical body 432 of a liquid crystal molecule 422 included in the isotropic orientation pattern 466.

As shown in FIG. 12A, the refractive index elliptical body 430 of the liquid crystal molecule 420 in the inclined orientation pattern is inclined relative to the substrate surface. The inclined orientation pattern including the liquid crystal molecules 420 has a refractive index $n_x$ in the delayed phase axis direction and a refractive index $n_y$ in the advanced phase axis direction within the plane parallel to the substrate 102.

The refractive index $n_x$ is the maximum refractive index within the plane, and the refractive index $n_y$ is the minimum refractive index. Here, $n_y$ is equal to the ordinary refractive index $n_o$ of the liquid crystal molecules 420. Furthermore, $n_x$ increases and decreases according to the elevation angle θ indicating the inclination of the refractive index elliptical body 430 of the liquid crystal molecule 420, but $n_y$ is a value that remains constant regardless of the elevation angle θ. Yet further, $n_x$ is at a minimum and equal to $n_y$ when the elevation angle θ is 90°, and increases as the elevation angle θ decreases.

As shown in FIG. 12B, the liquid crystal molecule 422 of the isotropic orientation pattern does not exhibit refractive index anisotropy, and the refractive index elliptical body 432 thereof is spherical. Therefore, the planar refractive index $n_x'$ and planar refractive index $n_y'$ in the plane parallel to the substrate 102 of the orientation pattern including the liquid crystal molecules 422 are equal to each other.

Here, with $n_e$ representing the extraordinary refractive index of the liquid crystal molecules 420 and $n_o$ representing the ordinary refractive index, $n_x$ can be calculated as shown below.

$$n_x = n_o n_e/(n_o^2 \cos^2 \theta + n_e^2 \sin^2 \theta)^{1/2} \qquad \text{Expression 2:}$$

Furthermore, $n_x'$ (and $n_y'$) can be calculated as shown below.

$$n_x' = (n_e + 2n_o)/3 \qquad \text{Expression 3:}$$

From Expressions 2 and 3, the elevation angle θ that causes $n_x$ and $n_x'$ to be equal can be derived. By setting the elevation angle θ of the refractive index elliptical bodies 430 of the liquid crystal molecules 420 such that $n_x$ is equal to $n_x'$, the polarization selectivity of the optical filter diffraction element 403 can be improved. The elevation angle θ of the refractive index elliptical bodies 430 of the liquid crystal molecules 420 may be set within a range of ±10° of the angle causing $n_x$ and $n_x'$ to be equal.

The following describes the principles of the diffraction of light incident to the optical filter diffraction element 403. As shown in FIG. 11, the Y-direction linearly polarized light 510 incident to the optical filter diffraction element 403 is passed by both the inclined orientation pattern 464 and the isotropic orientation pattern 466 of the liquid crystal layer 406. At this time, due to the difference between the refractive index $n_y$ of the inclined orientation pattern 464 and the refractive index $n_y'$ of the isotropic orientation pattern 466, the Y-direction linearly polarized light 510 is diffracted by the liquid crystal layer 406 and emitted as diffracted light 700.

On the other hand, the X-direction linearly polarized light 500 incident to the optical filter diffraction element 403 is passed by both the inclined orientation pattern 464 and the isotropic orientation pattern 466, but since the refractive index $n_x$ of the inclined orientation pattern 464 and the refractive index $n_x'$ of the isotropic orientation pattern 466 are equal, the X-direction linearly polarized light 500 is output as transmitted light 710 without being diffracted.

In the present embodiment, the phase difference is 0 when the X-direction linearly polarized light 500 is incident to the optical filter diffraction element 403. When the Y-direction linearly polarized light 510 is incident to the optical filter diffraction element 403, the phase difference can be calculated as $((n_e + 2n_o)/3 - n_o) \times d$, where d is the thickness of the liquid crystal layer 106. By appropriately setting the liquid crystal molecules used and the thickness of the liquid crystal layer 106, the optical filter diffraction element 403 can independently control the first order diffraction efficiency and the like of the Y-direction linearly polarized light 510.

In this way, the optical filter diffraction element 403 of the present embodiment can pass or diffract the incident light according to the polarization direction of this light. In other words, the optical filter diffraction element 403 can cause different diffraction efficiencies according to the polarization direction of the incident light.

In the same manner as in the embodiment shown in FIG. 6, the optical filter diffraction element 403 may be formed as a single body including the half-wave layer 107 and the splitting optical diffraction layer 108. In this case, the polarization filter, the half-wave plate, and the separating diffraction layer are formed on a single substrate, and therefore the overall thickness of the element can be kept low.

When the optical filter diffraction element 403 of the present embodiment is used in an optical pickup, the polarization direction of the laser light output by the laser may be parallel to the orientation direction of the inclined orientation pattern 464. The optical filter diffraction element 403 passes the polarized light parallel to the orientation direction of the inclined orientation pattern 464 in the plane parallel to the substrate 102, and diffracts the polarized light orthogonal to the passed light. Accordingly, the optical pickup including this optical filter diffraction element 403 passes the forward-path light that has been output from the laser and passed by the optical filter diffraction element 403, and can diffract and divert the polarized light that is leaked from the polarization beam splitter 5 and incident thereto.

FIGS. 13A to 13E show a method for manufacturing the optical diffraction element according to the fourth embodiment. FIGS. 13A to 13E show a step of forming the optical orientation layer, a light orientation step, a step of forming polymeric liquid crystal, a first liquid crystal hardening step, and a second liquid crystal hardening step, in the process for manufacturing the optical filter diffraction element 403.

First, as shown in FIG. 13A, during the step of forming the optical orientation layer, the optical orientation layer 434 including the anisotropic polymers is formed on one surface of the substrate 102. The step of forming the optical orientation layer is a step of applying an optical double-quantum orienting material to the entirety of one surface of the transparent substrate 102 and then drying the orienting material, for example. The application method and the optical double-quantum orienting material may be the same as in the other embodiments.

Next, as shown in FIG. 13B, during the light orientation step, the entire surface of the optical orientation layer 134 is irradiated with the linearly polarized light 490 from a direction that is at an angle relative to the surface of the substrate 102, thereby forming the optical orientation layer 434 in which the polymers have an orientation direction 498 that is at an angle relative to the surface of the substrate 102. The inclination of the linearly polarized light 490 and the inclination of the polymers have a positive correlation. Therefore, when the inclination of the inclined orientation pattern 464 to be formed later relative to the substrate 102 is desired to be greater, the inclination of the linearly polarized light 490 relative to the substrate 102 is increased.

Next, as shown in FIG. 13C, during the step of forming the polymeric liquid crystal, a polymeric liquid crystal solution including the polymeric liquid crystal molecules is applied on the optical orientation layer 434. The step of forming the polymeric liquid crystal may include a step of applying the polymeric liquid crystal solution and then drying the solution. The polymeric liquid crystal solution may include polymeric liquid crystal molecules, a solvent, and a polymerization initiator. The applied polymeric liquid crystal molecules are oriented in accordance with the direction of the optical orientation layer 434 positioned on the bottom surface thereof. The polymeric liquid crystal molecules are hardened as a result of polymerization through heating or light irradiation.

The suitable material to be used in the polymeric liquid crystal molecules is selected according to the intended use of the optical filter diffraction element 403 and the wavelength of the incident light, for example. The polymeric liquid crystal molecules may be rod-like thermotropic liquid crystal molecules, for example. The application can be realized using the methods described above.

Next, as shown in FIG. 13D, during the first liquid crystal hardening step, a portion of the polymeric liquid crystal molecules are polymerized, thereby forming a liquid crystal layer with a partial region that is hardened. In the present embodiment, the first liquid crystal hardening step may be a step of irradiating a portion of the polymeric liquid crystal molecules with exposure light 488 such as UV light that causes polymerization of the polymeric liquid crystal, while using a photomask 494. In this way, the inclined orientation pattern 464 is formed in the partial region of the liquid crystal layer 406 that has been exposed.

Next, during the second liquid crystal hardening step, the substrate 102 is heated to a temperature greater than or equal to the isotropic phase transition temperature of the polymeric liquid crystal molecules. As a result, the orientation of the polymeric liquid crystal molecules of the liquid crystal layer 406 in regions that were not hardened during the first liquid crystal hardening step are altered to be in an isotropic state. The liquid crystal molecules in the hardened region are hardened, and therefore their orientation is not altered. Next, the unhardened region is hardened to be in the isotropic state. In the present embodiment, the polymeric liquid crystal molecules are hardened by irradiating the entire surface of the polymeric liquid crystal with exposure light 492 such as UV light that causes polymerization of the polymeric liquid crystal In this way, with the manufacturing method of the present embodiment, it is possible to manufacture the optical diffraction element in which the diffraction efficiency differs according to the polarization direction of the incident light. Furthermore, by changing the inclination of the light incident to the optical orientation layer, the diffraction efficiency of light with a prescribed polarization direction can be easily controlled.

As described above, the optical diffraction element according to any one of the first to fourth embodiments includes a liquid crystal layer in which orientation patterns are formed as stripes. The width of each stripe can be set as needed according to the use of the optical diffraction element. The orientation patterns of the liquid crystal layer may be formed in a plaid pattern instead of as stripes.

The optical diffraction element according to any one of the first to fourth embodiments includes a liquid crystal layer in which two types of orientation patterns are arranged in an alternating manner, but instead, the liquid crystal layer may be formed by three or more types of patterns that repeat periodically.

A reflection prevention layer, a protective layer, or the like may be formed on both outer surfaces of the optical diffraction element. Furthermore, in each of the embodiments described above, the optical diffraction element includes the optical filter diffraction element and the splitting optical diffraction element, but the splitting optical diffraction element may be omitted and the optical diffraction element may be formed by only the optical filter diffraction element.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An optical pickup comprising:
   a laser that outputs polarized light;
   an optical diffraction element that receives the polarized light emitted from the laser;
   a beam splitter that splits polarized light from the optical diffraction element and reflected light from a target object; and
   a light receiving element that receives the reflected light resulting from the splitting by the beam splitter, wherein
   the optical diffraction element includes:

an optical filter diffraction element that is arranged to receive the polarized light from the laser and pass the polarized light from the laser without diffracting the polarized light;
a half-wave layer that rotates a polarization direction of incident light by 90°; and
a splitting optical diffraction layer that diffracts incident light, the optical filter diffraction element includes:
a substrate;
an orientation layer that is formed on one surface of the substrate and includes anisotropic polymers that are oriented perpendicular to or inclined relative to a surface of the substrate in at least a partial region of the orientation layer; and
a liquid crystal layer formed on the orientation layer, the liquid crystal layer includes a plurality of orientation patterns that are formed periodically and include liquid crystal molecules having different orientation directions, and
the orientation direction for at least some of the orientation patterns is perpendicular to or inclined relative to the surface of the substrate, as a result of aligning with the orientation of the orientation layer formed on a bottom surface of the orientation patterns.

2. The optical pickup according to claim 1, wherein
the orientation direction of the orientation patterns is parallel to a single substrate-perpendicular surface that is perpendicular to the surface of the substrate, and
a polarization direction of the laser light output by the laser is orthogonal to the single substrate-perpendicular surface of the optical diffraction element.

3. The optical pickup according to claim 1, wherein
the orientation patterns include an isotropic orientation pattern that is optically isotropic and an inclined orientation pattern that has an orientation direction that is inclined relative to the surface of the substrate,
the orientation direction of the inclined orientation pattern is aligned with the orientation of the orientation layer formed on the bottom surface of the orientation patterns, and
a polarization direction of the laser light output by the laser is parallel to the orientation direction of the inclined orientation pattern within a plane parallel to the surface of the substrate.

4. A method of manufacturing an optical diffraction element, comprising:
forming an optical orientation layer that includes anisotropic polymers on one surface of a substrate;
irradiating a partial region of the optical orientation layer with first linearly polarized light from a direction normal to the surface of the substrate, such that the polymers are oriented in a polarization direction of the linearly polarized light parallel to the substrate;
irradiating the entire surface of the optical orientation layer from a direction inclined relative to the surface of the substrate with second linearly polarized light that has lower intensity than the first linearly polarized light and a polarization direction parallel to that of the first linearly polarized light, such that the polymers that are not in the partial region are oriented at an incline relative to the surface of the substrate;
applying on the optical orientation layer a polymeric liquid crystal solution that includes polymeric liquid crystal molecules; and
hardening the polymeric liquid crystal molecules through polymerization.

5. A method of manufacturing an optical diffraction element, comprising:
forming an optical orientation layer that includes anisotropic polymers on one surface of a substrate;
irradiating the entire surface of the optical orientation layer from a direction inclined relative to the surface of the substrate with linearly polarized light, such that the polymers are oriented at an incline relative to the surface of the substrate;
applying on the optical orientation layer a polymeric liquid crystal solution that includes polymeric liquid crystal molecules;
hardening a portion of the applied polymeric liquid crystal molecules through polymerization; and
heating the substrate to a temperature greater than or equal to the isotropic phase transition temperature of the polymeric liquid crystal molecules, such that the remaining portion of polymeric liquid crystal molecules that were not hardened become hardened in an isotropic phase state.

* * * * *